March 8, 1949.  H. J. HIBSHMAN  2,463,875
HYDROCARBON SYNTHESIS PROCESS
Filed Sept. 18, 1946
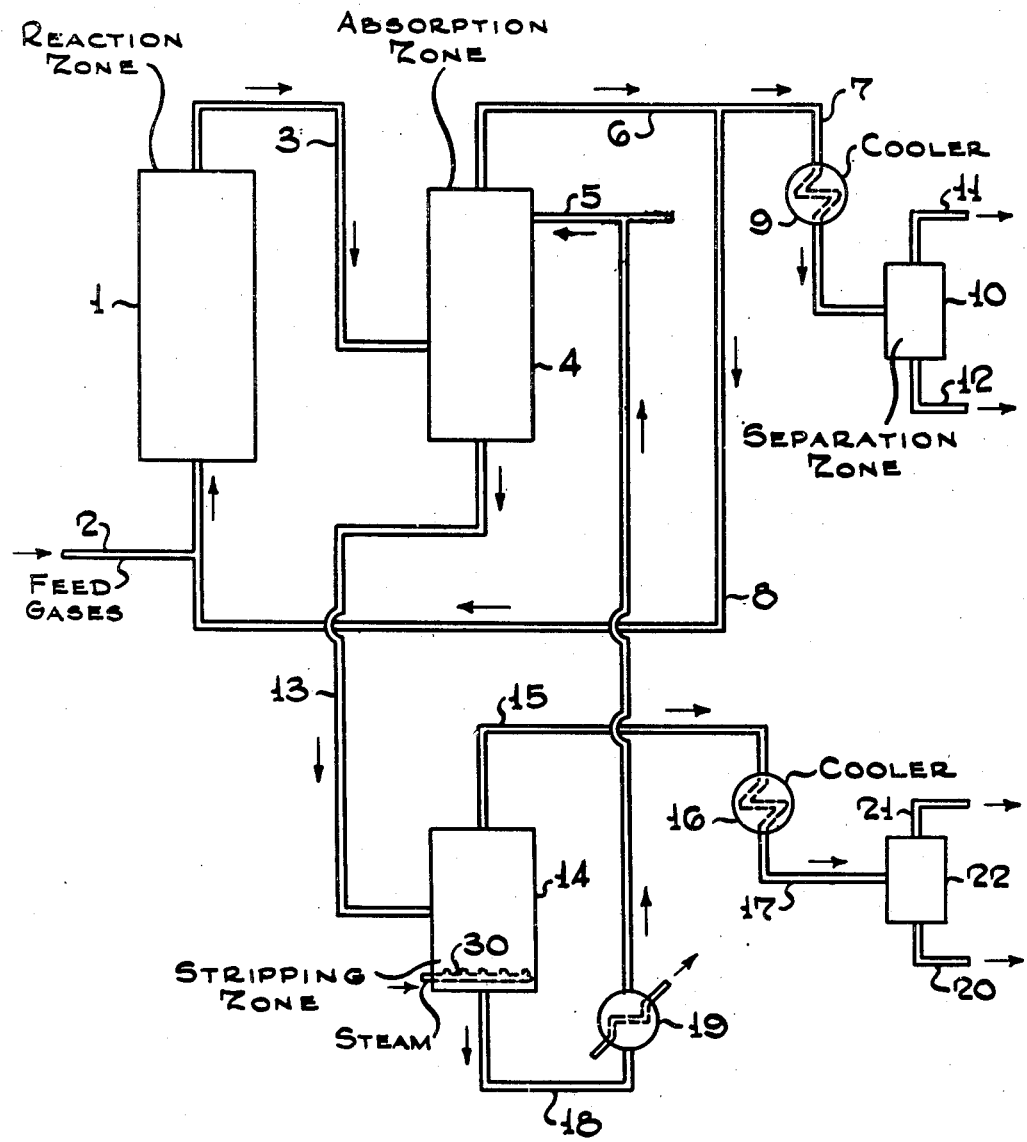
Henry J. Hibshman Inventor
By P. J. Whelan Attorney Patented Mar. 8, 1949

2,463,875

UNITED STATES PATENT OFFICE 2,463,875

HYDROCARBON SYNTHESIS PROCESS

Henry J. Hibshman, Plainfield, N. J., assignor to Standard Oil Development Company, a corporation of Delaware Application September 18, 1946, Serial No. 697,806

3 Claims. (Cl. 260—449.6)

The present invention relates to an improved hydrocarbon synthesis process wherein hydrocarbon constituents containing more than one carbon atom in the molecule are synthesized from feed gases comprising carbon monoxide and hydrogen. It is more particularly concerned with a hydrocarbon synthesis reaction wherein operating conditions are closely controlled in a manner to improve the thermal efficiency of the operation and to increase the yields of heavy oils. In accordance with the present process reactant gases removed overhead from the reaction zone are scrubbed with a heavy oil at the reaction temperature. At least a portion of the scrubbed reactant gases are separated from the scrubbing medium and recycled to the reaction zone.

It is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt and nickel. The catalysts are utilized either alone or are employed in conjunction with carriers, such as kieselguhr, diatomaceous earth, synthetic gels, silica, and alumina. Promoters, such as oxides of chromium, zinc, aluminum, magnesium, and the rare earth metals are used with the iron group metals. These catalysts are employed in either fixed bed or fluid catalyst operations.

The temperatures employed in the synthesis reaction vary widely, as for example, in the range from about 300° F. to about 800° F. and are generally in the range from about 350° F. to about 700° F. The pressures, likewise, vary considerably and are a function of other operating conditions, such as catalyst employed, activity of the catalyst, character of the feed gases and the temperatures utilized. Pressures in the range from about 1 to 100 and higher atmospheres have been suggested. The character of the feed gases introduced into the synthesis reaction zone depends somewhat on the particular temperatures and pressures, and upon the catalyst employed. For example, when employing iron type catalyst, it is preferred to use about 1 mol of carbon monoxide to about 2 mols of hydrogen, while when a cobalt catalyst is utilized, equal mols of hydrogen and carbon monoxide in the feed synthesis gases are desirable.

As pointed out heretofore, the catalyst may be either fixed bed or fluidized. In general, it is preferred to employ a fluidized operation. These operations are likewise well known. Usually the catalyst particles have a micron size in the range from about 20 to 200 microns and higher, and are maintained in a fluid ebullient state by means of upflowing suspending gases. The velocity of the upflowing gases generally varies from 0.5 to 5 feet per second.

In operations of the character described, a once-through operation or recycle operation may be employed. In the recycle operation the reactant gases are cooled to condense water and condensible constituents. The uncondensed gases are removed from the condensed constituents and at least a portion of the uncondensed gases recycled to the synthesis zone. One advantage of the recycle operation is that the conversion of the feed is higher than in a once-through process. On the other hand, a conventional recycle operation has a relatively low thermal efficiency. Furthermore, there is a substantial increase in the production of low molecular weight hydrocarbons when employing a recycle operation of the conventional type.

In accordance with my invention I employ a recycle operation which overcomes inherent disadvantages present when a conventional type of recycle operation is employed. In accordance with my process the reactant gases are removed from the synthesis zone and are scrubbed preferably countercurrently with a selected scrubbing medium at a temperature which is substantially equivalent to the temperature maintained in the synthesis zone. By using the absorbing mediums that I propose, at the temperatures I propose, the higher boiling hydrocarbons are selectively removed from the reactant gases. Scrubbed reactant gases are separated from the absorbing medium and are returned to the reaction or synthesis zone. By operating in this manner, increased conversion of the carbon monoxide to desirable high boiling hydrocarbons, boiling in the gasoline range and above, is secured. This is due to the fact that considerable quantities of the relatively low boiling hydrocarbons are not absorbed in the absorbing medium and are thus recycled to the synthesis zone and converted to higher boiling hydrocarbons, as for example, those boiling in the gasoline boiling range and above. Furthermore, by operating in accordance with my process, an improved thermal efficiency on the operation is attained.

The process of my invention may be more readily understood by reference to the diagrammatical drawing illustrating a modification of the same. Synthesis feed gases comprising oxides of carbon and hydrogen are introduced into reaction zone 1 by means of feed line 2. Reaction zone 1 may contain any suitable catalyst and is maintained at a suitable temperature and pressure for securing the desired reaction products. For the purpose of illustration, it is assumed that the catalyst in reaction zone 1 comprises an iron catalyst supported on silica and that the temperature is in the range from about 450° F. to 500° F. and the pressure is in the range from about 25 to 50 lbs. gauge. After a sufficient time of contact the reactant gases are removed overhead from reaction zone 1 by means of line 3 and introduced into the bottom of absorption zone 4. These gases flow upwardly through absorption zone 4 and countercurrently contact the downflowing absorption medium which is introduced into the upper section of zone 4 by means of line 5. Absorption zone 4 may contain any suitable contacting or distributing means. The scrubbed gases are removed overhead from scrubbing zone 4 by means of line 6. A portion of these gases may be withdrawn from the system by means of line 7 while at least a portion of the same are recycled to reaction zone 1 by means of line 8. The portion withdrawn by means of line 7 may be cooled and condensed in zone 9 and passed into separation zone 10. Uncondensed gases are removed overhead from separation zone 10 by means of line 11 and handled in any manner desirable, while the condensate is removed by means of line 12 and further distilled or treated in order to separate any number of fractions of the desired specification.

As previously discussed, the absorption medium introduced into absorption zone 4 by means of line 5 flows downwardly through zone 4 and contacts the upflowing reactant gases. The absorption medium containing the absorbed constituents is removed from scrubbing zone 4 by means of line 13 and introduced into stripping zone 14. Temperature and pressure conditions in zone 14 are regulated to remove overhead by means of line 15 the absorbed constituents, which constituents are condensed in condensing zone 16 and introduced into zone 22 by means of line 17. If desired, open steam may be introduced into the bottom of stripping zone 14 by means of line 30 in order to secure complete removal of the absorbed components from the absorption medium. The condensed constituents introduced into zone 22 may be segregated into any desirable product fractions by distillation or other refining means. For the purpose of illustration, a lighter fraction is removed from zone 22 by means of line 21, while a higher boiling fraction is removed by means of line 20. The absorption medium substantially free of absorbed constituents is removed from stripping zone 14 by means of line 18 and recycled to the top of absorption zone 4. Prior to recycling the absorption medium to the top of zone 4, the absorption medium is heated or cooled to the temperature corresponding to the temperature of the synthesis zone by heating or cooling means 19.

My process generally comprises removing reactant gases from the synthesis zone and countercurrently treating these gases with an absorption medium at substantially synthesis temperature in order to remove or absorb high molecular weight reaction products. The scrubbed reactant gases or at least a portion of the scrubbed gases are recycled to the reaction zone at a temperature substantially equivalent to the temperature existing in the reaction zone.

The catalyst employed in the reaction zone may be any suitable hydrocarbon synthesis catalyst. Suitable catalysts are for example, iron, cobalt, or nickel supported on suitable carriers and containing promoters as for example, fluorine and alkali metals. The temperatures may likewise vary in the range from 300 to 700° F. and the pressure in the range from 1 to 100 atmospheres. A catalyst which is particularly suitable for this operation is an iron catalyst prepared from carbonyl iron, iron powder, or iron hydroxides with less than 1% of a promoter consisting of a metal oxide not reduced at the synthesis temperature as for example alkali metal oxides. The catalyst is prepared by reducing the oxide with hydrogen at from 1000° F. to 1100° F. followed by sintering at 1400° F. to 1550° F. which results in a volume shrinkage of about 30% to 40%. The temperatures maintained in the absorption zone should be preferably equivalent to the reaction zone temperature and certainly should not vary more than 50° F. to about 100° F. from the temperature existing in the reaction zone. It is desirable to maintain the pressure in the scrubbing zone as high as possible, preferably at the pressure used in the synthesis zone which may be in the range from about 5 to 1000 lbs. per square inch absolute.

The scrubbing medium may be any heavy petroleum oil having a gravity in the range from about 10° A. P. I. to 26° A. P. I. and a vapor pressure below from 0.1 to 0.6 pound per square inch at a temperature in the range from about 300° F. to about 700° F. A very desirable absorption oil comprises an asphalt having a specific gravity of from 0.80 to 1.02 and a softening point less than 300° F. It is desirable to circulate from about 1 to 10 barrels of oil per barrel of product obtained. The amount required will vary with the temperature and pressure employed. For example at an absorption temperature of 200° F. a satisfactory oil rate is about 4 barrels of oil per barrel of product providing the pressure is about 50 pounds per square inch. On the other hand, if the absorption temperatures are 300° F. or 410° F. an oil rate of 4 barrels of oil per barrel of product is satisfactory providing the pressures are about 215 pounds and 450 pounds per square inch respectively.

The process of the present invention is not to be limited by any theory as to mode of operation, but only in and by the following claims in which it is desired to claim all novelty insofar as the prior art permits.

What is claimed is:

1. Improved process for the preparation of hydrocarbon constituents containing more than one carbon atom in the molecule which comprises, contacting feed gases comprising oxides of carbon and hydrogen with a catalyst selected from the class consisting of iron, cobalt, and nickel at a temperature in the range from 300° F. to 700° F. and at a pressure in the range from 15 to 1000 pounds per square inch absolute, removing the reactant gases overhead, introducing these reactant gases into an absorption zone and countercurrently contacting said reactant gases with an oil having a vapor pressure at the absorption temperature below about 0.1 to 0.6 pound per square inch at a temperature in the range from 300° F. to 700° F., removing overhead from said absorption zones scrubbed gases and recycling a portion of said gases to said reaction zone.

2. Improved process for the production of hydrocarbon constituents containing more than one carbon atom in the molecule which comprises, contacting feed gases comprising oxides of carbon and hydrogen in a reaction zone in the presence of a suitable catalyst under suitable temperature and pressure conditions, removing overhead from said reaction zone reaction gases, scrubbing said reaction gases with an absorption medium in the form of a petroleum oil having an A. P. I. gravity in the range of from 10° to 26°, at a temperature substantially equivalent to the temperature maintained in said reaction zone, removing scrubbed gases from said absorption zone and cecycling a portion of said gases to said reaction zone, removing the absorption medium from said absorption zone and handling the same in a manner to remove and recover hydrocarbon products containing four and more carbon atoms in the molecule.

3. Process in accordance with claim 2 in which said catalyst is selected from the class consisting of iron, cobalt, and nickel, and in which said scrubbing medium is a petroleum asphalt having a softening point in the range from 50° F. to 350° F. and in which the absorption medium which is treated to remove higher boiling hydrocarbons is recycled to said absorption zone after the removal of said higher boiling hydrocarbons.

HENRY J. HIBSHMAN.

REFERENCES CITED

The following references are of record in the file of this patent:

UNITED STATES PATENTS

| Number | Name | Date |
| --- | --- | --- |
| 2,253,607 | Boyd et al. | Aug. 26, 1941 |
| 2,345,957 | Wirth et al. | Apr. 4, 1944 |
| 2,434,537 | Barr et al. | Jan. 13, 1948 |